(No Model.) 2 Sheets—Sheet 1.

J. M. SAILER.
FEEDER AND BAND CUTTER FOR THRESHING MACHINES.

No. 575,129. Patented Jan. 12, 1897.

Witnesses.
Inventor.
John M. Sailer,
By Benedict & Morsell
Attorneys.

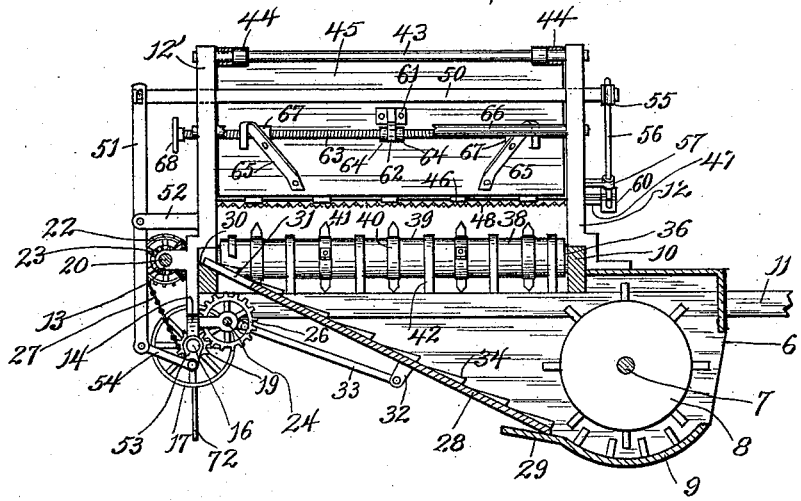
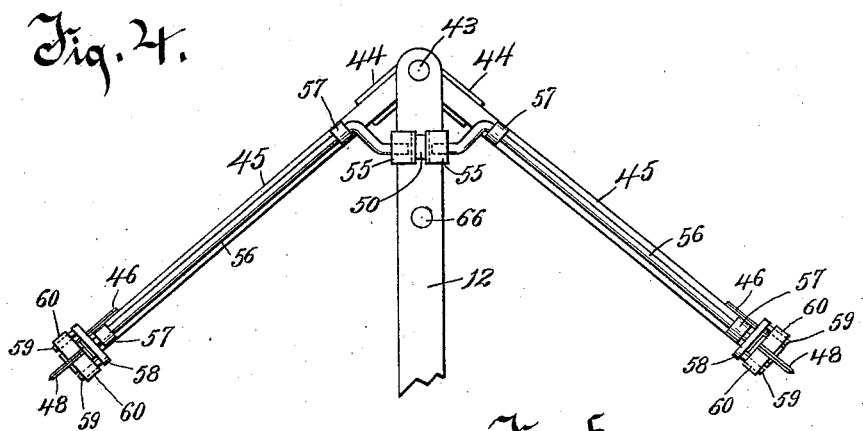
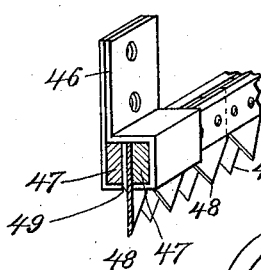

UNITED STATES PATENT OFFICE.

JOHN M. SAILER, OF JANESVILLE, WISCONSIN.

FEEDER AND BAND-CUTTER FOR THRESHING-MACHINES.

SPECIFICATION forming part of Letters Patent No. 575,129, dated January 12, 1897.

Application filed October 11, 1895. Serial No. 565,353. (No model.)

*To all whom it may concern:*

Be it known that I, JOHN M. SAILER, of Janesville, in the county of Rock and State of Wisconsin, have invented a new and useful Improvement in Feeders and Band-Cutters for Threshing-Machines, of which the following is a description, reference being had to the accompanying drawings, which are a part of this specification.

My invention has relation to improvements in feeders and band-cutters for threshing-machines.

The primary object is to provide a construction wherein the sheaves will be fed from the side or sides and the band severed by means of improved cutting mechanism.

A further object is the construction whereby after the band of the sheave has been severed the quantity of loose grain which is fed to the threshing mechanism is regulated.

The device, furthermore, is compact and simple in construction, inexpensive of production, and can be readily attached to any old machine and connected up to the gearing thereof without the necessity of changing any of the parts of such machine.

The invention contemplates other objects which will hereinafter more fully appear.

The invention consists of the devices and parts, or their equivalents, as hereinafter more fully set forth.

Figure 1:
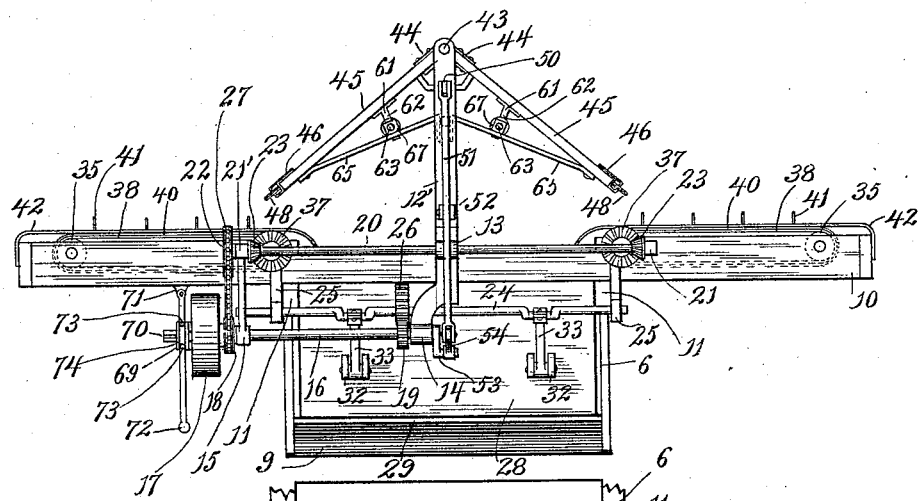
Figure 2:
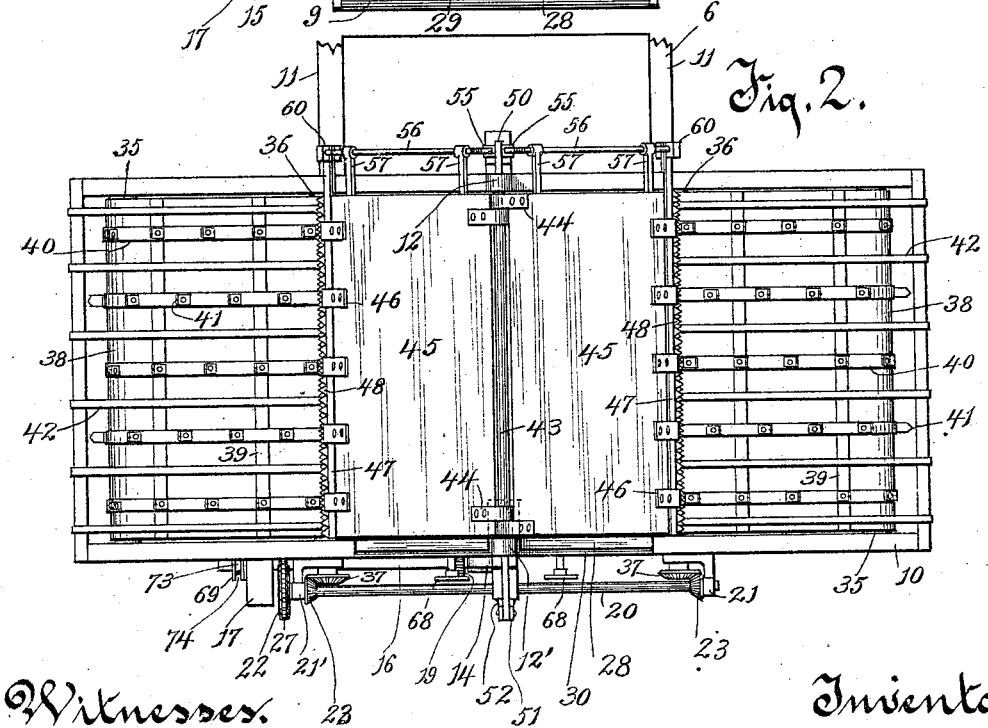

In the accompanying drawings, Figure 1 is an end view of the feeding and band-cutting attachment. Fig. 2 is a plan view of Fig. 1, showing a fragment of the threshing-machine frame to which the device is attached. Fig. 3 is a longitudinal sectional view on the line 3 3 of Fig. 2. Fig. 4 is a detail edge view, on an enlarged scale, of the adjustable knife-carrying boards; and Fig. 5 is a detail to show clearly the bearings for the cutter-bars.

Referring to the drawings, the numeral 6 indicates a fragment of the frame of an ordinary form of threshing-machine, in which is mounted, upon a transverse shaft 7, the usual drum or cylinder 8, and below the drum or cylinder the concave 9. The frame of the attachment consists of rectangular framework 10, which is placed upon and secured to the rearwardly-extending side beams 11 11 of the threshing-machine frame. Extending upwardly from central points of the opposite side pieces of this frame are standards 12 12'. Standard 12' is provided with an outwardly-extending bearing-lug 13, and its lower end is extended downwardly below the frame 10 and formed into a bearing-eye 14. Depending from the frame 10 is a bearing-arm 15. A shaft 16 is mounted in this arm and in the eye 14. At the outer end of shaft 16 is carried a band-pulley 17, which is adapted to be connected up to the actuating mechanism of the threshing-machine by means of a belt. (Not shown.) Upon the band-pulley end of the shaft is mounted a sprocket-wheel 18, while upon the opposite end is a pinion 19.

Passing through the eye of the bearing-lug 13 is a shaft 20, the ends of said shaft journaled in bearings 21 21', the latter being formed at the upper end of arm 15. This shaft carries at one extremity a sprocket-wheel 22 and near opposite ends beveled pinions 23 23. Below shaft 20 is a shaft 24, the ends thereof journaled in bearing arms or hangers 25 25. This shaft is provided with two cranks and carries thereon a gear-wheel 26, with which the pinion 19 meshes, whereby rotation is imparted to the crank-shaft. Rotation is given to the upper shaft 20 by means of a sprocket-chain 27, connecting the two sprocket-wheels 18 and 22.

Beneath the center of the frame 10 is an inclined carrier-board 28, the lower forward end thereof resting upon an extension 29 from the concave and the rear upper end thereof resting upon the upper edge of the rear side bar of frame 10, said edge being beveled off, as indicated at 30, to admit of the rear end of the carrier-board sliding smoothly thereover. This end of the board is slotted, as indicated at 31, in order to permit of its straddling the standard 12', so that said standard will not interfere with the rear reciprocation of the carrier-board. Connected to the under side of the carrier-board are bifurcated lugs 32 32, between the furcate parts of which the rear ends of links 33 33 are pivoted. The forward ends of these links are connected to the respective cranks of the crank-shaft 24. The carrier-board in Fig. 3 of the drawings is shown at the extreme forward limit of its movement. At the extreme rear limit of its movement the forward end of the board would rest upon the extremity of the extension 29.

This disposition of the carrier-board and the described connection of said board to the links 33 enables the board to be readily removed when it becomes necessary to obtain access to the drum or cylinder or interior under parts of the machine. This removal is effected when the board is at the limit of its rear movement, at which time the forward end of said board is supported at the extremity of the extension 29. The rear end of the board is then raised, turning upon the pivotal connection between the depending lugs 32 and the links 33. After said end is raised a certain distance the forward end will clear the extension 29 and thereby allow the board to drop clear of the framework. The upper side of the carrier-board is provided with a series of ridges 34, having their upper faces inclined forwardly. These ridges are disposed transversely over the board, each transverse line being composed of a plurality of said ridges.

Mounted in the outer ends of the frame 10 are rolls 35 35, and at a distance inwardly from these rolls similar rolls 36 36 are also mounted in the frame. Upon the extended ends of the shafts of these latter rolls are mounted beveled gears 37 37, which mesh with the beveled pinions 23 23 and are rotated thereby. Passing around the rolls 35 36 are endless belts 38 38, preferably of canvas or like flexible material. These belts are rendered more or less rigid by means of transverse strips 39 of sheet steel or similar metal. The belts have also secured thereto lengthwise longitudinal endless strips 40, advisably of leather. Riveted or otherwise secured at distances apart on these longitudinal strips are angle-irons 41, the upwardly-extending fingers thereof adapted to engage the sheaves, so as to enable said sheaves to be readily carried along with the belts. These fingers (if the contingency were not guarded against) would have a tendency in the travel of the belts to carry the grain around and beneath the inner rolls 36 36. To obviate this, I provide a series of longitudinal slats, which lie close to the belts, and on which the grain is supported directly. The outer ends of these slats are connected to the end pieces of the frame 10, while the inner ends of said slats are curved downwardly, as clearly shown. It is obvious that when the loose grain reaches these curved ends the fingers of the angle-irons 41 will merely push said grain over the curved ends onto the carrier-board 28, the possibility of the grain being carried under thereby absolutely prevented.

While I have described the endless feed-belts as composed of canvas or like flexible material, provided with the transverse strips 39, yet I do not wish to be understood as thereby restricting myself to this particular construction, as any desirable form of side carrying mechanism may be used.

At the upper ends of the standards 12 12' is carried a non-rotatable shaft 43, upon which is swung, by means of hinge-leaves 44 44, the adjustable knife-carrying boards 45 45. At the lower edges of these boards are secured a series of arms 46, having their lower ends formed into angular bearings, in which cutter-bars 47 47 reciprocate. The opposing faces of these bars have secured thereto the cutting-blades 48 48, which blades project through slots 49 in the angular bearings and are provided with V-shaped cutting-points.

Extending parallel with and beneath the non-rotatable shaft 43 is a bar 50, the ends of which extend through the standards 12 12'. One end of this bar is connected to an upright lever 51, fulcrumed at the end of an arm 52, projecting rearwardly from standard 12'. The lower end of this upright lever 51 is connected to a crank 53 on the end of shaft 16 by means of a link 54. The opposite end of bar 50 has connected thereto two U-shaped blocks 55 55, in which blocks are received the cranked ends of rock-shafts 56 56, said shafts turning in bearings 57 57, secured to the edges of the boards 45. The lower ends of the rock-shafts terminate in heads or plates 58 58, from which project fingers 59 59, which fingers enter apertures therefor in lugs 60 60, projecting at right angles from the cutter-bars 47. This construction practically forms a double-crank connection between the rock-shafts and the cutter-bars. It is obvious that when the machine is running the rotation of the shaft 16 will, through the crank 53, link 54, upright lever 51, bar 50, and rock-shafts 56, impart opposite reciprocations to the cutter-bars and the cutting mechanism carried thereby, whereby a shearing cut is made. The movement of the cutting-blades is very slight, so slight indeed that the points of one cutting-blade will never register with the points of the opposing blade.

Beneath the knife-carrying boards 45 45 are secured brackets 61 61, said brackets provided with projecting lugs 62 62, which lugs straddle screw-shafts 63 63. Each screw-shaft carries thereon collars 64 64, which abut against the lug 62, and thereby prevent endwise or longitudinal movement of said screw-shaft. One half of each screw-shaft is provided with right-hand threads and the other half with left-hand threads. Secured to the inner face of each board 45, near the lower edge thereof, are straps 65 65, said straps extending upwardly and inclining outwardly and having their upper extremities bent downwardly at right angles, which angular bends are adapted to bear against the rod 66, which rod has its ends supported in the uprights 12 12'. The upper surface of each strap is formed or provided with a threaded sleeve 67, through which the screw-shaft passes, the threads of said sleeve corresponding to the threads of that portion of the shaft which passes through the sleeve. One end of each screw-shaft is provided with a suitable head 68 for convenience in turning the same. It is obvious that inasmuch as the screw-shafts are held against longitudinal movement when said shafts are turned the knife-carrying boards are either raised or lowered, as the case may be, and thereby the distance of the lower edges of said board from the endless feed-belts 38 is conveniently regulated.

The band-pulley 17 is mounted loosely on shaft 16, and its hub is formed with clutch-teeth adapted to be engaged by similar teeth of a clutch-collar 69, said clutch-collar sliding on a feather 70. Pivoted to a lug 71, depending from the frame 10, is a lever 72, said lever provided with projecting fingers 73 73, adapted to engage an annular groove 74 of the clutch-collar. Whenever it is desired to stop the belt and other working parts of the attachment, all that is necessary to be done is to throw the lever 72 outwardly, which of course will disconnect the clutch-collar from the clutch-hub, whereby the rotation of the pulley 17 by the driving-belt does not affect the shaft 17.

In the operation of the invention the bundles of grain are first placed on the slats above the side feed-belts with their lengths transverse to the line of travel of said belts. The sheaves are engaged by the upwardly-extending fingers of the angle-irons and are thereby readily carried along by the belts, and when beneath the edges of the inclined knife-carrying boards the knives act upon the bands of the sheaves and sever said bands. As the cutting-blades reciprocate in a direction transverse to the line of travel of the feed-belts, the loose grain as soon as the bands are cut is by this movement of the knives spread out over the surfaces of the belts. This grain is carried over the curved ends of the slats 42 and deposited lengthwise upon the carrier-board 28, which board as it is reciprocated forces the grain to the cylinder or drum. As the carrier-board has a perfectly even and smooth sliding movement instead of a bumping action, as in other forms of machines, the straw or grain is slid down to the drum, and thereby the proper feeding from the top of the grain is insured.

It will be apparent that by my improvements, as shown and described, wherein the sheaves are fed in the first instance by side feeding-belts, said sheaves may be fed to the belts either very rapidly or very slowly, and yet a continuous or uninterrupted stream of the loose grain is carried to the cylinder or drum by the carrier-board. In machines in which an end feed is employed unless the feed is very rapid there will be intervals of time when no grain is passing between the drum and the concave, while yet the moving parts continue to work. This disadvantage my machine overcomes in a simple manner.

By the provision of the adjustable boards 45 any excess feed of grain is compensated for, inasmuch as such overplus grain will work up or accumulate on these inclined boards and at the first opportunity work down to and pass through the spaces or throats between the edges of the boards and the feed-belts. The width of these spaces or throats is conveniently regulated by the mechanism hereinbefore described, namely, by turning the screw-shafts 63.

It is obvious that my attachment can be readily connected to any form of threshing-machine, inasmuch as all that is necessary is to run a belt from the actuating mechanism of such machine to the pulley-wheel 17. The attachment can be as readily disconnected merely by slipping off the belt of pulley 17 and removing any attaching-bolts that may be employed.

What I claim as my invention, and desire to secure by Letters Patent, is—

1. The combination, of a frame adapted for attachment to a threshing-machine, or like apparatus, feeding mechanism mounted in said frame and adapted for feeding the grain to the machine, a support or supports extending upwardly from the frame, a board extending downwardly from the support or supports and having its lower edge terminating a desired distance above the feeding mechanism to form a throat or space between its lower edge and the feeding mechanism, said board being of a width corresponding to, or substantially corresponding to, the width of the feeding mechanism, and said board being inclined in a direction to bring its lower edge toward the incoming grain, thereby permitting the surplus grain to pass upwardly and to be held thereon until properly fed, cutting mechanism carried at the lower edge of the board, and means for actuating the cutting mechanism.

2. The combination, of a frame adapted for attachment to a threshing-machine, feeding mechanism mounted in said frame, an inclined board mounted above the feeding mechanism, cutting-blades carried at the lower edge of the board, a bar running lengthwise of the board, a rotatable shaft, a connection between said shaft and the bar, whereby the bar is reciprocated, a rock-shaft having a crank connection at one end of the bar and a double-crank connection at the opposite end with the two cutting-blades, whereby said blades are reciprocated in opposite directions, substantially as described.

3. The combination, of a frame adapted for attachment to a threshing-machine, feeding mechanisms, oppositely-inclined boards mounted above the feeding mechanisms, cutting-blades carried at the lower edges of the boards, a bar running lengthwise of each board, a rotatable shaft, a connection between the shaft and the bar, whereby the bar is reciprocated, rock-shafts each having a crank connection at one end of the bar, and a double-crank connection at the opposite end with the cutting-blades, whereby said blades are reciprocated in opposite directions, substantially as described.

4. The combination, of a frame adapted for attachment to a threshing-machine, feeding mechanism mounted in said frame, an inclined board mounted above the feeding mechanism, a screw-shaft held against longitudinal movement, and provided with right and left hand threads, a rod running lengthwise of the board, and straps each secured at one end to the board and having its opposite end bearing against the rod, said straps provided with threaded collars through which the screw-shaft passes, the threads of one collar corresponding to the right-hand threads of the shaft, and the threads of the other collar corresponding to the left-hand threads of the shaft, substantially as described.

5. The combination, of a frame adapted for attachment to a threshing-machine, a driven shaft mounted in said frame and receiving motion from the actuating mechanism of the threshing-machine, said shaft having a cranked end, an upper shaft having a beveled gear thereon, a connection between the two shafts for imparting rotation to the upper one thereof, rolls journaled in the frame, the shaft of the inner roll provided with a beveled gear meshing with the previously-mentioned beveled gear, a belt passing over the rolls, an inclined board mounted above the belt, cutting-blades carried at the lower edge of said board, a bar running lengthwise of the board, a connection between one end of said bar and the crank of the driven shaft, and a rock-shaft running along the end edge of the board, said shaft having a crank connection at one end with the bar, and a double-crank connection at the opposite end with the cutting-blades, whereby said blades are reciprocated in opposite directions, substantially as described.

In testimony whereof I affix my signature in presence of two witnesses.

JOHN M. SAILER.

Witnesses:
JOHN CUNNINGHAM,
KATE CANTILLON.